United States Patent
Hinkle et al.

(10) Patent No.: US 7,254,558 B2
(45) Date of Patent: Aug. 7, 2007

(54) METHOD AND SYSTEM FOR PRIORITIZING DEBT COLLECTIONS

(75) Inventors: Burl Shannon Hinkle, High Point, NC (US); Jeffrey L. Grubb, High Point, NC (US)

(73) Assignee: GE Corporate Financial Services, Inc., Norwalk, CT (US)

( * ) Notice: Subject to any disclaimer, the term of this patent is extended or adjusted under 35 U.S.C. 154(b) by 1195 days.

(21) Appl. No.: 09/746,172

(22) Filed: Dec. 21, 2000

(65) Prior Publication Data

US 2002/0116245 A1    Aug. 22, 2002

(51) Int. Cl.
*G06Q 40/00*    (2006.01)
(52) U.S. Cl. ............................. 705/40; 705/1; 705/30; 705/34; 705/38; 235/379
(58) Field of Classification Search ................. 705/40, 705/1, 30, 34, 38; 235/379
See application file for complete search history.

(56) References Cited

U.S. PATENT DOCUMENTS

| | | | |
|---|---|---|---|
| 5,436,965 A | 7/1995 | Grossman et al. |
| 5,550,734 A | 8/1996 | Tarter et al. |
| 5,704,044 A | 12/1997 | Tarter et al. |
| 5,761,650 A | 6/1998 | Munsil et al. |
| 5,991,733 A | 11/1999 | Aleia et al. |
| 6,098,052 A | 8/2000 | Kosiba et al. |
| 6,405,173 B1 | 6/2002 | Honarvar et al. |

*Primary Examiner*—James Trammell
*Assistant Examiner*—Daniel S. Felten
(74) *Attorney, Agent, or Firm*—Armstrong Teasdale LLP

(57) ABSTRACT

A collections prioritization method and system for use in a financial services business is disclosed. The system is configured to generate a collection priority value from information stored on the system and queue the accounts for collection action based on the priority value and user entered filtering criteria. In one embodiment, the system is further configured to generate a report on the efficiency of collection by a collector.

42 Claims, 14 Drawing Sheets

Morning Scrub — 170

| Item # | Time Started Working Item | Time Finished Working Item | To be Called? Yes | No |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |
| 9 | | | | |
| 10 | | | | |
| 11 | | | | |
| 12 | | | | |
| 13 | | | | |
| 14 | | | | |
| 15 | | | | |
| 16 | | | | |
| 17 | | | | |
| 18 | | | | |
| 19 | | | | |
| 20 | | | | |

Suggested Action Codes — 176

| | |
|---|---|
| L | Sent to Legal Collections |
| A | Adjustments Needs to Take Action |
| I | Faxed Invoice to Customer |
| S | Faxed Statement to Customer |
| M | Left Message with other than Right Person Contact |
| R | Spoke with the Right Person |
| P | Received a Promise to Pay |

Prompts and 30 Program Invoices NOT Called — 172

| Item # from Morning Scrub | Time Started Working Item | Time Finished Working Item | Action Code (L, A, I, S) | Remarks (Describe Any Other Actions Taken...) |
|---|---|---|---|---|
| | | | | |

— 174

Calls Made

| Item # from Morning Scrub | Time Call Started | Time Hung Up Phone | Time Completed Action | No Answer Yes | No | Right Person Contacted? Yes | No | Message Left? Yes | No | Promised to Pay? Yes | No | Other Outcome... |
|---|---|---|---|---|---|---|---|---|---|---|---|---|
| | | | | | | | | | | | | |

FIG. 6

| Action Codes | Explanation | Automatic Date Next Action |
|---|---|---|
| D | Proof of Delivery Sent | 14 |
| I | Invoice Copy Faxed | 14 |
| L | Referred to Legal Collections | 30 |
| A | Referred to Adjustments | 1 |
| S | Faxed Statement to Customer | 14 |
| M | Left a Message for Customer to Call Back (Receptionist, Answering Machine, etc.) | 1 |
| R | Spoke with the "Right" Person, did not get a "Promise to Pay", and they did not Request any Information (i.e. Customer is Researching, etc.) | 14 |
| P | Received a "Promise to Pay" | 14 |
| B | Busy Signal | 2 hours |
| N | No Answer | 2 hours |
| O | Applied Payment, Applied CM, etc. | Entered by Collector if Applicable |

| | A | B | C | D | E | F | G | H | I | J | K | L |
|---|---|---|---|---|---|---|---|---|---|---|---|---|
| | | | | Collector Report Page | | | | | | | | |
| 1 | | Name: | | | | Team Leader: | | | | | A | |
| 2 | | | | | | Morning Scrub | | | | | | |
| 3 | | | | | To Be Called? | | | | | | To Be Called? | |
| 4 | Item # | Time Started Working Item | Time Finished Working Item | Time On Item | Yes | No | Item # | Time Started Working Item | Time Finished Working Item | Time On Item | Yes | No |
| 5 | 1 | 55 | 74 | 19 | X | | 11 | 44 | 45 | 1 | X | |
| 6 | 2 | 16 | 18 | 2 | X | | 12 | 45 | 46 | 1 | X | |
| 7 | 3 | 18 | 19 | 1 | X | | 13 | 46 | 47 | 1 | X | |
| 8 | 4 | 19 | 20 | 1 | X | | 14 | 47 | 48 | 1 | X | |
| 9 | 5 | 21 | 36 | 15 | X | | 15 | 47 | 48 | 1 | X | |
| 10 | 6 | 36 | 37 | 1 | X | | 16 | 48 | 49 | 1 | X | |
| 11 | 7 | 37 | 41 | 4 | X | | 17 | 48 | 53 | 5 | X | |
| 12 | 8 | 41 | 42 | 1 | X | | 18 | 53 | 54 | 1 | X | |
| 13 | 9 | 42 | 43 | 1 | X | | 19 | 55 | 56 | 1 | X | |
| 14 | 10 | 43 | 44 | 1 | X | | 20 | 56 | 57 | 1 | X | |
| 15 | | | | | | | Average Time For Item Preparation--> | | | 3 | | |
| 16 | | | | | | | Max Time For Item Preparation--> | | | 19 | | |
| 17 | | | | | | | Min Time For Item Preparation--> | | | 1 | | |
| 18 | | | | | | | | | | | | |
| 19 | | | | | | | | | | | | |

FIG. 10

| M | N | O | P | Q | R | S | T | U | V |
|---|---|---|---|---|---|---|---|---|---|
| | | | Prompts and 30 Program Invoices NOT Called | | | | | | |
| Item # From Morning Scrub | Time Started Working Item | Time Finished Working Item | Total Time On Item | Action Code (L, A, I, S) | | Remarks (Describe any other actions taken...) | | | |
| 1 | 50 | 59 | 28 | S | | | | | |
| 3 | 15 | 35 | 21 | S | | | | | |
| 13 | 34 | 36 | 3 | A | | | | | |
| | | | 0 | | | | | | |
| | | | 0 | | | | | | |
| | | | 0 | | | | | | |
| | | | 0 | | | | | | |
| | | | 0 | | | | | | |
| | | | 0 | | | | | | |
| Average Time On Item Not Called--> | | | 17.333333 | | 0 | <--Times L Used | | | |
| Max Time On Item Not Called--> | | | 28 | | 1 | <--Times A Used | | | |
| Min Time On Item Not Called--> | | | 3 | | 0 | <--Times I Used | | | |
| | | | | | 2 | <--Times S Used | | | |

FIG. 11

|   | W | X | Y | Z | AA | AB |
|---|---|---|---|---|---|---|
| 1 |   |   |   |   |   |   |
| 2 |   |   |   |   |   |   |
| 3 |   |   |   |   |   |   |
| 4 | Item # From Morning Scrub | Time Call Started | Time Hung Up Phone | Length of Call | Time Completed Action | Total Time On Item |
| 5 | 1 | 45 | 48 | 3 | 50 | 24 |
| 6 | 2 | 0 | 1 | 1 | 1 | 3 |
| 7 | 3 | 2 | 10 | 8 | 14 | 13 |
| 8 | 4 | 41 | 44 | 3 | 44 | 4 |
| 9 | 5 | 6 | 10 | 4 | 10 | 19 |
| 10 | 6 | 11 | 13 | 2 | 14 | 4 |
| 11 | 7 | 15 | 16 | 1 | 16 | 5 |
| 12 | 8 | 18 | 18 | 0 | 19 | 2 |
| 13 | 13 | 20 | 26 | 6 | 34 | 14 |
| 14 | 14 | 37 | 46 | 9 | 50 | 13 |
| 15 | Average Length of Call--> 3.7 |   |   |   | Average Time On Item Called--> | 10.1 |
| 16 | Max Length of Call--> 9 |   |   |   | Max Time On Item Called--> | 24 |
| 17 | Min Length of Call--> 0 |   |   |   | Min Time On Item Called--> | 2 |
| 18 |   |   |   |   |   |   |
| 19 |   |   |   |   |   |   |

| AC | AD | AE | AF | AG | AH | AI | AJ | AK | AL | AM | AN | AO |
|---|---|---|---|---|---|---|---|---|---|---|---|---|
| Calls Made | | | | | | Promised to Pay? | | Other Outcome.... | | | | |
| No Answer | | Right Person Contacted? | | Message Left? | | | | | | | | |
| Yes | No | Yes | No | Yes | No | Yes | No | | | | | |
| X | | X | | | | | X | S | | | | |
| | | | X | X | | | | S | | | | |
| X | | X | | | X | | | | | | | |
| X | | X | | | X | | | | RFCVD CHECK INFO FROM CUSTOMER | | | |
| | X | | X | X | X | X | | | | | | |
| | X | | | | X | | | | | | | |
| X | | X | | X | | | | | | | | |
| X | | X | | | X | X | | | | | | |
| X | | X | | | X | X | | | | | | |

Times N (No Answer) Occurred--> 8
Times R (Right Person Contacted) Occurred--> 6
Times M (Message Left) Occurred--> 3
Times P (Received Promise to Pay) Occurred--> 3

Collector Efficiency Metrics

| Collector ID | A | B | C | D | E | F | OVERALL |
|---|---|---|---|---|---|---|---|
| Average Time For Item Preparation | 3 | 5 | 2 | 3 | 2 | 1 | 3 |
| Max Time For Item Preparation | 19 | 26 | 4 | 10 | 3 | 2 | 26 |
| Min Time For Item Preparation | 1 | 1 | 1 | 1 | 1 | 1 | 1 |
| Average Time For Item NOT Called | 17 | 10 | 0 | 5 | 4 | 2 | 6 |
| Max Time For Item NOT Called | 28 | 20 | 0 | 12 | 4 | 3 | 28 |
| Min Time For Item NOT Called | 3 | 2 | 0 | 2 | 4 | 1 | 0 |
| Average Time On Item Called | 10 | 8 | 5 | 8 | 4 | 6 | 7 |
| Max Time On Item Called | 24 | 11 | 10 | 22 | 6 | 10 | 24 |
| Min Time On Item Called | 2 | 4 | 2 | 1 | 3 | 3 | 1 |
| Average Length of Call | 4 | 8 | 3 | 4 | 3 | 2 | 4 |
| Max Length of Call | 9 | 50 | 6 | 14 | 6 | 7 | 50 |
| Min Length of Call | 0 | 1 | 0 | 1 | ·2 | 0 | 0 |

Sample Individual Metrics (Trial Data Collected) (Phase I Implementation)

| Collector ID | A | B | C | D | E | F | Average |
|---|---|---|---|---|---|---|---|
| # L's (Sent to Legal) | 0 | 0 | 0 | 0 | 0 | 0 | 0 |
| Percentile | 0% | 0% | 0% | 0% | 0% | 0% | |
| # A's (Adjustments Action) | 1 | 1 | 0 | 0 | 1 | 1 | 1 |
| Percentile | 40% | 40% | 0% | 0% | 40% | 40% | |
| # I's (Faxed Invoice) | 0 | 3 | 0 | 0 | 0 | 0 | 1 |
| Percentile | 0% | 100% | 0% | 0% | 0% | 0% | |
| # S's (Faxed Statement) | 2 | 0 | 0 | 0 | 1 | 0 | 1 |
| Percentile | 100% | 0% | 0% | 0% | 80% | 0% | |
| # N's (No Answer) | 8 | 6 | 0 | 5 | 0 | 0 | 3 |
| Percentile | 100% | 80% | 0% | 60% | 0% | 0% | |
| # R'S (Right Person Contacted) | 6 | 7 | 5 | 6 | 1 | 4 | 5 |
| Percentile | 60% | 100% | 40% | 60% | 0% | 20% | |
| # M's (Message Left) | 3 | 3 | 4 | 2 | 6 | 2 | 3 |
| Percentile | 40% | 40% | 80% | 0% | 100% | 0% | |
| # P's (Rec'd Promise to Pay) | 3 | 3 | 2 | 0 | 1 | 1 | 2 |
| Percentile | 80% | 80% | 60% | 0% | 20% | 20% | |

Sample Individual Metrics (No Data Collected) (Phase I Implementation)

| Collector ID | A | B | C | D | E | F | Average |
|---|---|---|---|---|---|---|---|
| # O's (Other Action Taken) | 0 | 0 | 0 | 0 | 0 | 0 | 0 |
| Percentile | 0 | 0 | 0 | 0 | 0 | 0 | |
| # Promises Kept | 0 | 0 | 0 | 0 | 0 | 0 | 0 |
| Percentile | 0 | 0 | 0 | 0 | 0 | 0 | |

Sample Team and Overall Level Metrics (No Data Collected) (Phase I Implementation)

| Team ID | A | B | C | D | Average |
|---|---|---|---|---|---|
| $ Collected | $ - | $ - | $ - | $ - | $ - |
| Percentile | 0% | 0% | 0% | 0% | |
| # Items "Leftover" Daily | 0 | 0 | 0 | 0 | 0 |
| Percentile | 0% | 0% | 0% | 0% | |
| Average Days Past Due | 0 | 0 | 0 | 0 | 0 |
| Percentile | 0% | 0% | 0% | 0% | |

FIG. 14

METHOD AND SYSTEM FOR PRIORITIZING DEBT COLLECTIONS

BACKGROUND OF THE INVENTION

This invention relates generally to financial services and more particularly to a method and system used to set priorities in collections of debts.

Effective collections procedures are at the heart of any financial service business. Despite efforts to reduce credit risks, inevitably some debtors become delinquent in repaying their debts. Management of collections procedures necessitates setting priorities on the order and vigor with which the creditor pursues different debtors so as to maximize return on the time, effort, and expense of attempting to collect the debt. Setting collections priorities has hitherto been done in a non-systematic fashion based upon the experience of collections officers. It would be desirable to have a systematic, objective, and consistent way of assigning priorities to debt collection efforts that could be used by all collections officers of an organization regardless of their level of experience.

BRIEF SUMMARY OF THE INVENTION

In an exemplary embodiment, the present invention is a collections prioritization system for use in a financial services business. The system receives debt-related information from a user, also referred to as a collector, compares the received information with pre-stored information, then queues delinquent accounts based on a collection priority value generated from the pre-stored information and filtered by the collector information, which is generally related to collector skill level. The system displays the queued account information on the user's device.

The debt-related information may include, for example, number of days past due for an item, value of an item, customer's total outstanding balance, customer's credit score, customer's internal payment history score, number of days since action due date for an item, and total number of open invoices for that customer.

BRIEF DESCRIPTION OF THE DRAWINGS

FIG. 6 is an exemplary embodiment of a user's forms;

FIG. 9 is a list of action codes;

FIG. 10 is an exemplary embodiment of a collector report page;

FIG. 11 is a continuation page of an exemplary collector report page;

FIG. 12 is a second continuation page of an exemplary collector report page;

FIG. 13 is a third continuation page of an exemplary collector report page; and

FIG. 14 is a list of efficiency criteria for collectors.

DETAILED DESCRIPTION OF THE INVENTION

The inventive system uses an algorithm to establish priorities for collection efforts based upon the amount owed, the time the item has been overdue, the debtor's credit score, the customer's internal payment history score, the number of days since the action due date for the item, and the total number of open invoices for that debtor. It then generates a list of collection priorities for a collector to use in making collection efforts and a form for reporting collection outcomes. The collection outcomes entered into the inventive system by a collector determine the priority, action, and action date the system assigns to the item in a subsequently generated collection priority list.

Figure 1:
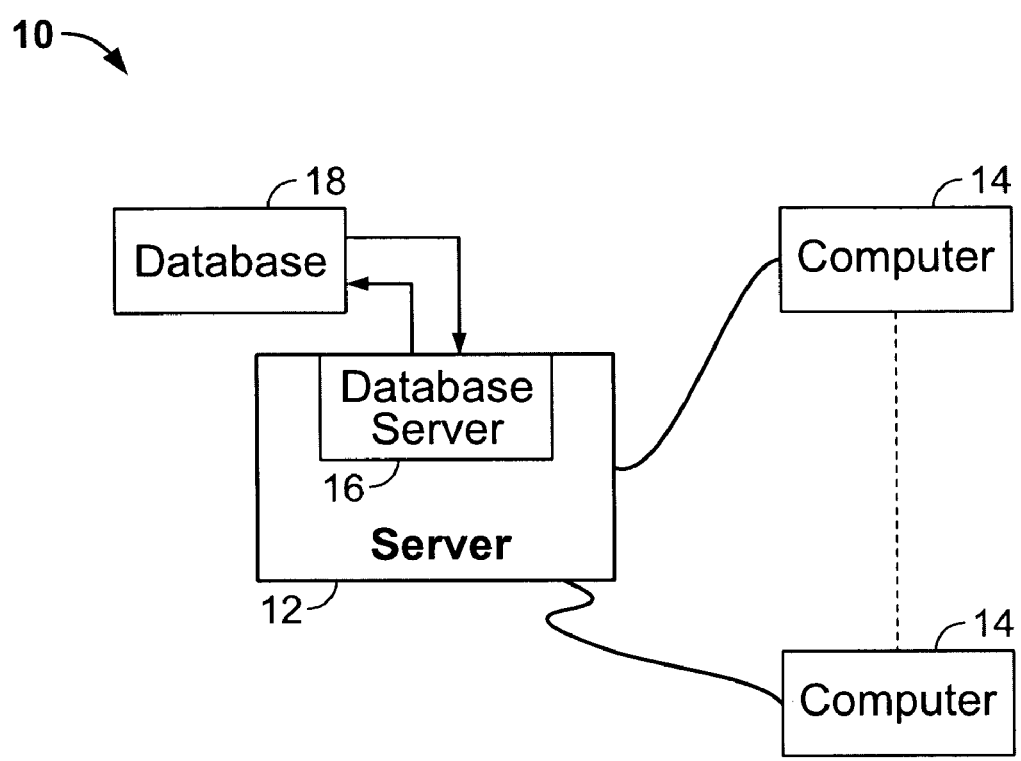
FIG. 1 is a block diagram of a system in accordance with one embodiment of the present invention.

FIG. 1 is a block diagram of a system 10 in accordance with one embodiment of the present invention. System 10 includes a server sub-system 12, sometimes referred to herein as server 12, and a plurality of user devices 14 connected to server 12. In one embodiment, devices 14 are computers including a web browser, and server 12 is accessible to devices 14 via a network such as an intranet or the Internet. In an alternative embodiment, devices 14 are servers for a network of customer devices.

Devices 14 are interconnected to the network, such as a local area network (LAN) or a wide area network (WAN), through many interfaces including dial-in-connections, cable modems and high-speed ISDN lines. Alternatively, devices 14 are any device capable of interconnecting to a network including a network-based phone or other network-based connectable equipment. Server 12 includes a database server 16 connected to a centralized database 18 containing plug-in relay information. In one embodiment, centralized database 18 is stored on database server 16 and can be accessed by potential users at one of user devices 14 by logging onto server sub-system 12 through one of user devices 14. In an alternative embodiment centralized database 18 is stored remotely from server 12.

Figure 2:
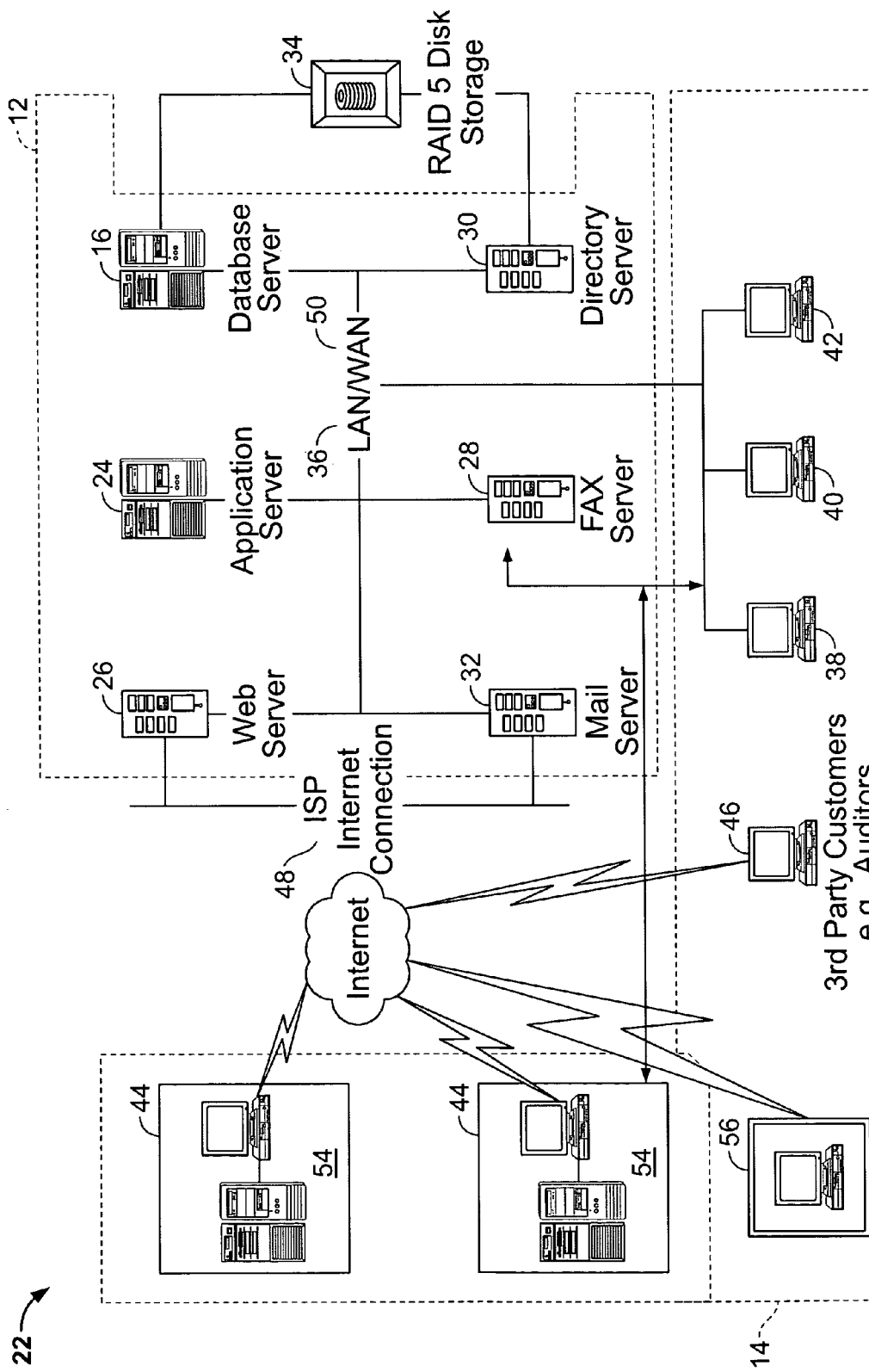
FIG. 2 is an expanded version block diagram of an exemplary embodiment of a server architecture of an alternative system.

FIG. 2 is an expanded version block diagram of an exemplary embodiment of a server architecture of a system 22. System 22 includes server sub-system 12 and user devices 14. Server sub-system 12 includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator workstation 38, a user workstation 40, and a supervisor workstation 42 are coupled to LAN 36. Alternatively, workstations 38, 40, and 42 are coupled to LAN 36 via an Internet link or are connected through an intranet.

Each workstation 38, 40, and 42 is a personal computer having a web browser. Although the functions performed at the workstations typically are illustrated as being performed at respective workstations 38, 40, and 42, such functions can be performed at one of many personal computers coupled to LAN 36. Workstations 38, 40, and 42 are illustrated as being associated with separate functions only to facilitate an understanding of the different types of functions that can be performed by individuals having access to LAN 36.

In another embodiment, server sub-system 12 is configured to be communicatively coupled to various individuals or employees 44 and to third parties, e.g., users, 46 via an ISP Internet connection 48. The communication in the exemplary embodiment is illustrated as being performed via the Internet, however, any other wide area network (WAN) type communication can be used in other embodiments, i.e., the systems and processes are not limited to being practiced via the Internet. In addition, and rather than a WAN 50, local area network 36 could be used in place of WAN 50.

In the exemplary embodiment, any employee 44 or user 46 having a workstation 54 can access server sub-system 12. One of user devices 14 includes a workstation 54 located at a remote location. Workstations 54 are personal computers having a web browser. Also, workstations 54 are configured to communicate with server sub-system 12. Furthermore, fax server 28 communicates with employees 44 and users 46 located outside the business entity and any of the remotely located user systems, including a user system 56 via a telephone link. Fax server 28 is configured to communicate with other workstations 38, 40, and 42 as well.

Figure 3:
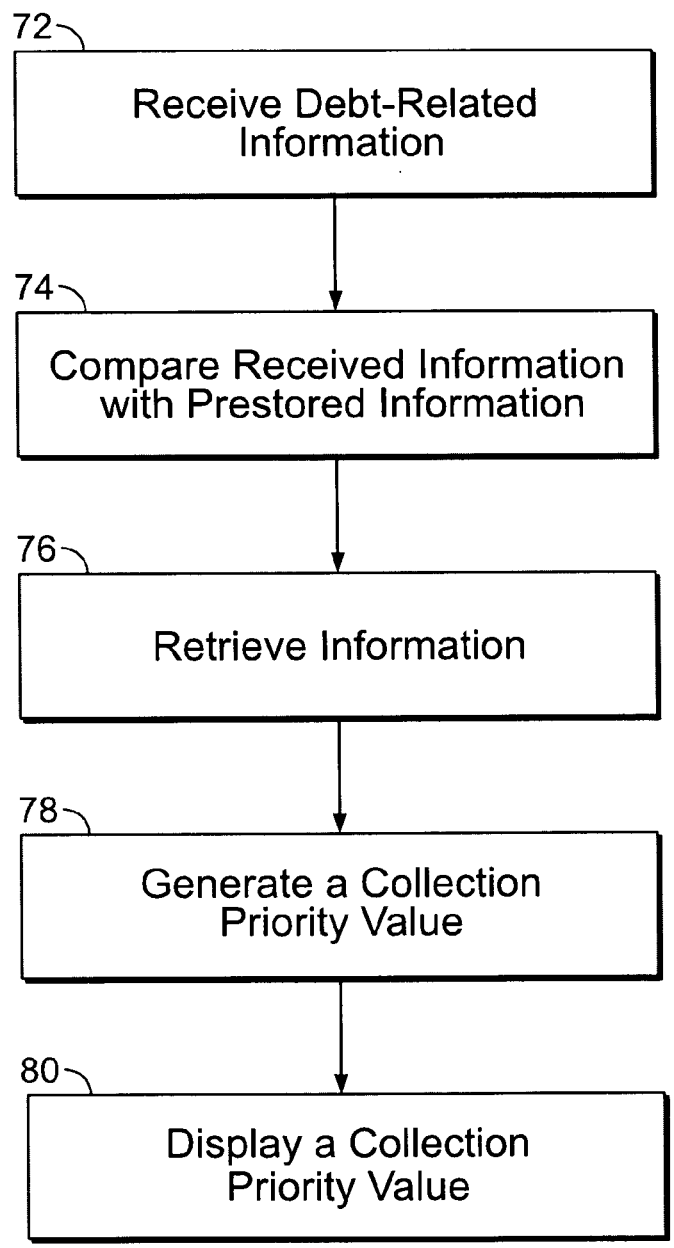
FIG. 3 is a flow diagram of a network-based method for prioritizing debt collections.

FIG. 3 is a flow diagram 70 for a network-based method for prioritizing debt collection. System 10 (shown in FIG. 1) receives 72 debt information from a user. In one embodiment, the user inputs the information into a device (such as device 14 shown in FIG. 1) that transmits the information to a server (such as server 12 shown in FIG. 1). The debt information is received from the user via a graphical user interface as will be described in greater detail below.

Server 12 compares 74 the received debt related information to pre-stored information accessible by server 12. In one embodiment, the pre-stored information is stored in a database that resides on server 12. In an alternative embodiment, the pre-stored information is stored in a database remote from server 12. The pre-stored information includes information regarding debt collection. System 10 retrieves 76 relevant information relating to debt collection from server 12, and generates 78 a collection priority value.

System 10 (shown in FIG. 1) generates a priority value (PV) from the equation $$PV = a_1 x_1 + a_2 (\log(x_2))^{a_7} + a_3 \left[ \frac{x_2}{\left(\frac{x_3}{y}\right)} \right] + a_4 x_4 + a_5 x_5 + a_6 x_6$$

where:
$x_1$=Number of Days Past Due for Item,
$x_2$=Value of Item
$x_3$=Customer's Total Outstanding Balance
$x_4$=Customer's Credit Score
$x_5$=Customer's Internal Payment History Score, a trend value derived from the values discussed below
$x_6$=Number of Days Since Action Due Date for Item
$y$=Total Number of Open Invoices for that Customer and
$a_1$=Optimized Coefficient for $x_1$
$a_2$=Optimized Coefficient for $x_2$
$a_3$=Optimized Coefficient for $X_3$
$a_4$=Optimized Coefficient for $X_4$
$a_5$=Optimized Coefficient for $X_5$
$a_6$=Optimized Coefficient for $X_6$, and
$a_7$=Optimized Coefficient for $\log(x_2)$ In an exemplary embodiment, $a_1$=1.43, $a_2$=37.37, $a_3$=11.59, $a_4$=1, $a_5$=8.89, $a_6$=2.69, $a_7$=0.95, but as will be apparent to those skilled in the art, other values may be used within the scope of the present invention.

Customer's Internal Payment History Score is defined by $$x_5 = \text{internal Payment History Score} = 2.5\left[\left(\frac{z_1 - x_1}{a}\right)\left(\frac{z_1}{b}\right) + \left(\frac{z_2}{c}\right)\right]$$

Where, $$z_1 = \left(\frac{D_1(T_1 + T_2 + T_3)}{9T_1} + \frac{D_2(T_1 + T_2 + T_3)}{9T_2} + \frac{D_3(T_1 + T_2 + T_3)}{9T_3}\right),$$

normalized average days late $$z_2 = \left(\frac{\left[D_3 \log(T_3) - \frac{T_3}{T_2} D_2 \log(T_2)\right] + \left[D_2 \log(T_2) - \frac{T_2}{T_1} D_1 \log(T_1)\right]}{2}\right),$$

days late trend where
a=Worst case number of days beyond the customer's average number of days late,
b=Worst case average days late caused by cyclic markets
c=Absolute value of the days late velocity from on period to another
$T_1$=Current Period
$T_2$=Previous Period
$T_3$=Prior Period
$D_1$=Current Period
$D_2$=Previous Period and
$D_3$=Prior Period.

In an exemplary embodiment, a=10, b=180, c=10, but as will be appreciated by those skilled in the art, other values of these coefficients can be used within the scope of the present invention.

Figure 4:
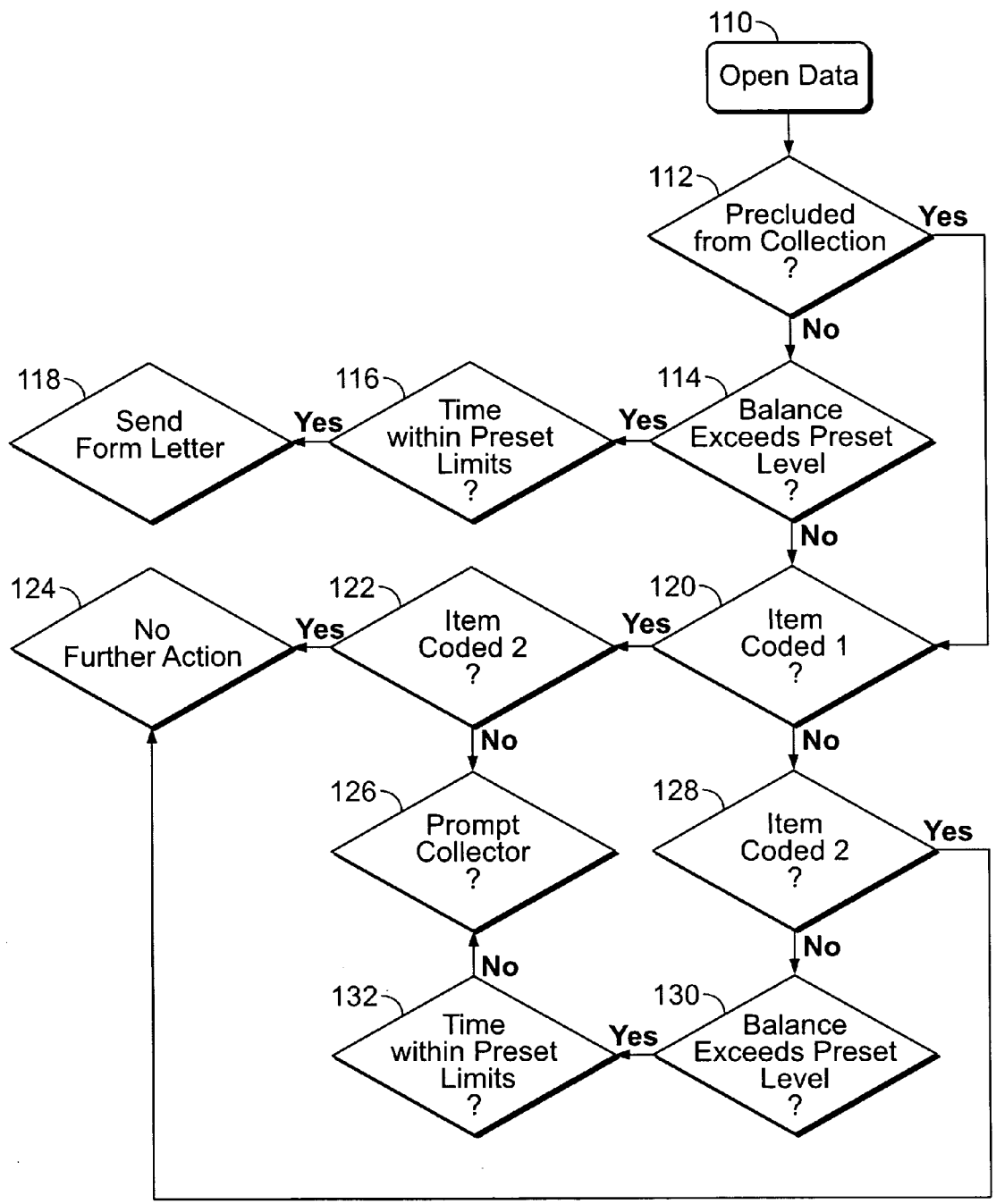
FIG. 4 is a flowchart that describes the operation of the system.

FIG. 4 is a flowchart of system 10 (shown in FIG. 1) in operation. A user opens 110 a set of data containing at least one item for collection, and system 10 ascertains whether any of the items are precluded 112 from collection. An item is precluded from collection by at least one of having any payments on account (PA) or invoices coded abort, by having the file coded to stop statements and letters, by relating to a non-notification client, by having the invoiced coded with a dispute code, or by having the invoice coded UP, LP, or S, where these codes are described in detail below. If the balance exceeds 114 a preset level, system 10 then queries 116 whether the balance has been due for a time within certain preset limits. In an exemplary embodiment system 10 queries whether the balance has been due for more than 30 but less than 50 days. If the answer to query 116 is affirmative, and a specified form letter has not been sent previously, system 10 then sends 118 the specified form letter. If the balance does not exceed the preset value in 114, system 10 then queries 120 whether the item is coded 1. In one embodiment items coded 1 include those with codes CM, UP, PA, and RC, details of which are discussed in greater detail below. An affirmative response to query 120 causes system 10 to query 122 whether the item is coded 2. In one embodiment items coded 2 include those with codes 90, those with a "deal" code, and those with a "no letter" code. If the response to query 122 is affirmative, system 10 indicates 124 that no further action is to be taken. If the response to query 122 is negative, system 10 then prompts 126 the collector.

If the response to query 120 is negative, system 10 queries 128 whether the item is coded 2, where items coded 2 are defined as above. If the answer is affirmative, system 10 then indicates 124 that no further action is to be taken. If the answer is negative, system 10 then queries whether the balance exceeds 130 a present level, and if it does, then system 10 inquires whether the time is within 132 preset limits. If the answer is affirmative, then system 10 prompts 126 the collector.

Figure 5:
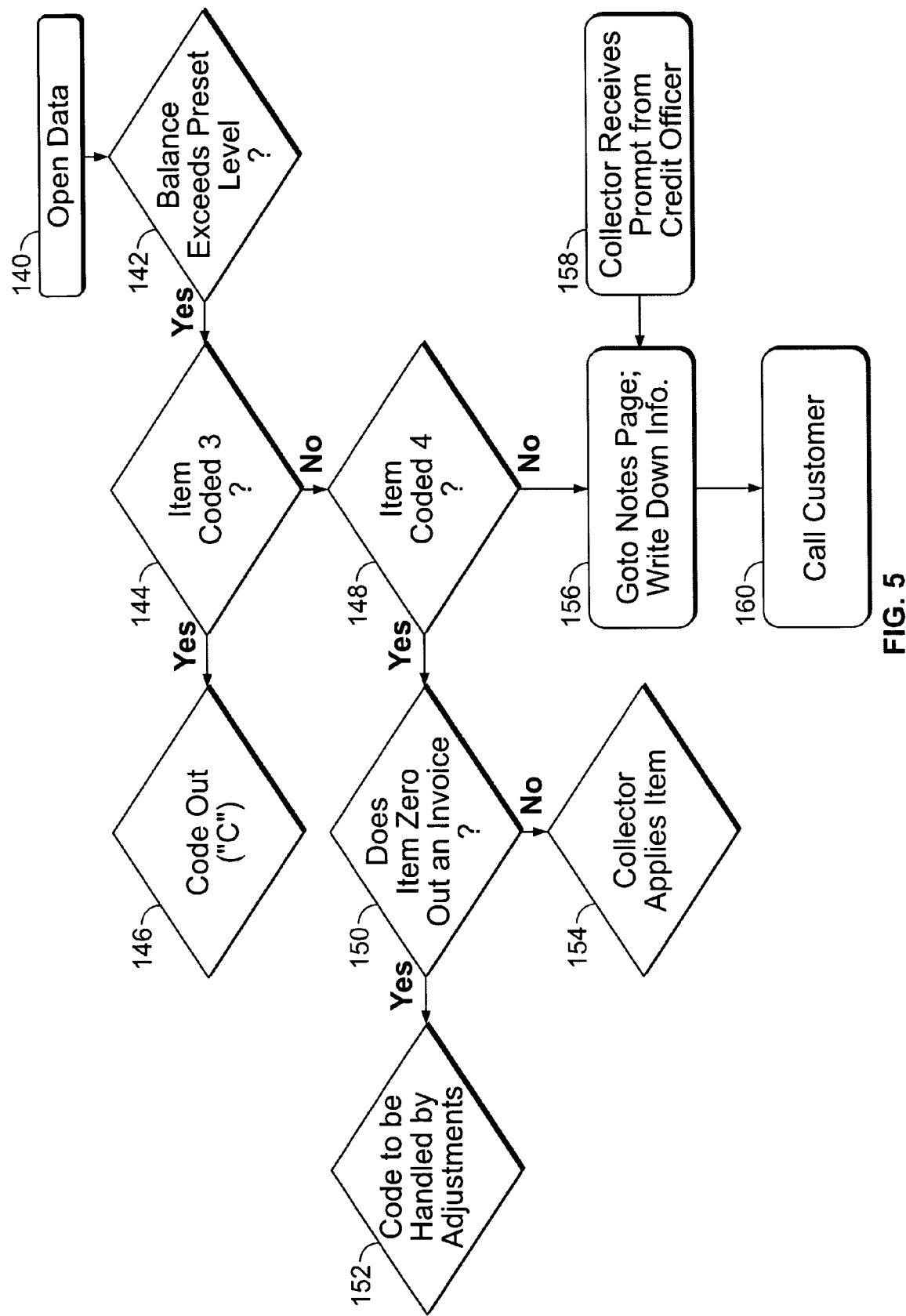
FIG. 5 is a further flowchart showing operation of the system.

FIG. 5 is a further flowchart showing operation of system 10. When a collector or other user opens 140 a data set containing at least one item, system 10 inquires 142 whether the balance on that item exceeds a preset level. If the answer is affirmative, system 10 then queries 144 whether the item is coded 3. In an exemplary embodiment, code 3 includes an item code UP or LP, discussed in more detail below, or an account payment plan. If the answer to query 144 is affirmative, system 10 then codes out 146 the item ("C").

If the response to query 144 is negative, system 10 then inquires 148 date whether the item is coded 4. In an exemplary embodiment, code 4 includes an item code CM, UP, or PA, where these codes are discussed in greater detail below. If the response to query 148 is affirmative, system 10 then inquires 150 whether the item zeros out an invoice. If the answer to query 150 is affirmative, assistant and then indicates 152 that the item is to be handled by adjustments. If the response to query 150 is negative, system 10 then indicates 154 that the collector is to apply the item.

If the response to query 148 is negative, system 10 then opens 156 a Goto Notes Page, where the collector can write down information relating to the item. The GoTo Notes Page is also activated by system 10 when a collector receives 158 a prompt from a credit officer. When the GoTo Page is opened, the collector calls 160 the customer.

FIG. 6 is an exemplary embodiment of user forms displayed by system 10. The user forms include a Morning Scrub area 170 which includes an item number, a time started working on the item column, a time finished working on the item column, and a "to be called?" column. The user forms also include a Prompts and 30 Program Invoices Not Called area 172 that includes an item number from morning scrub column, a time started working on the item column, a time finished working on item column, an action code column, and a remarks column. The user forms further include a Calls Made area 174 that includes and an item number from morning scrub column, a time call started called, a time hung up phone column, a time completed action column, a no answer column, a right person contacted column, a message left column, a promised to pay column, and an other outcome column. The user's forms still further includes a Suggested Action Codes display area 176, that specifies the codes used to categorize a given item in Prompts and 30 Program Invoices Not Called area 172.

Figure 7:
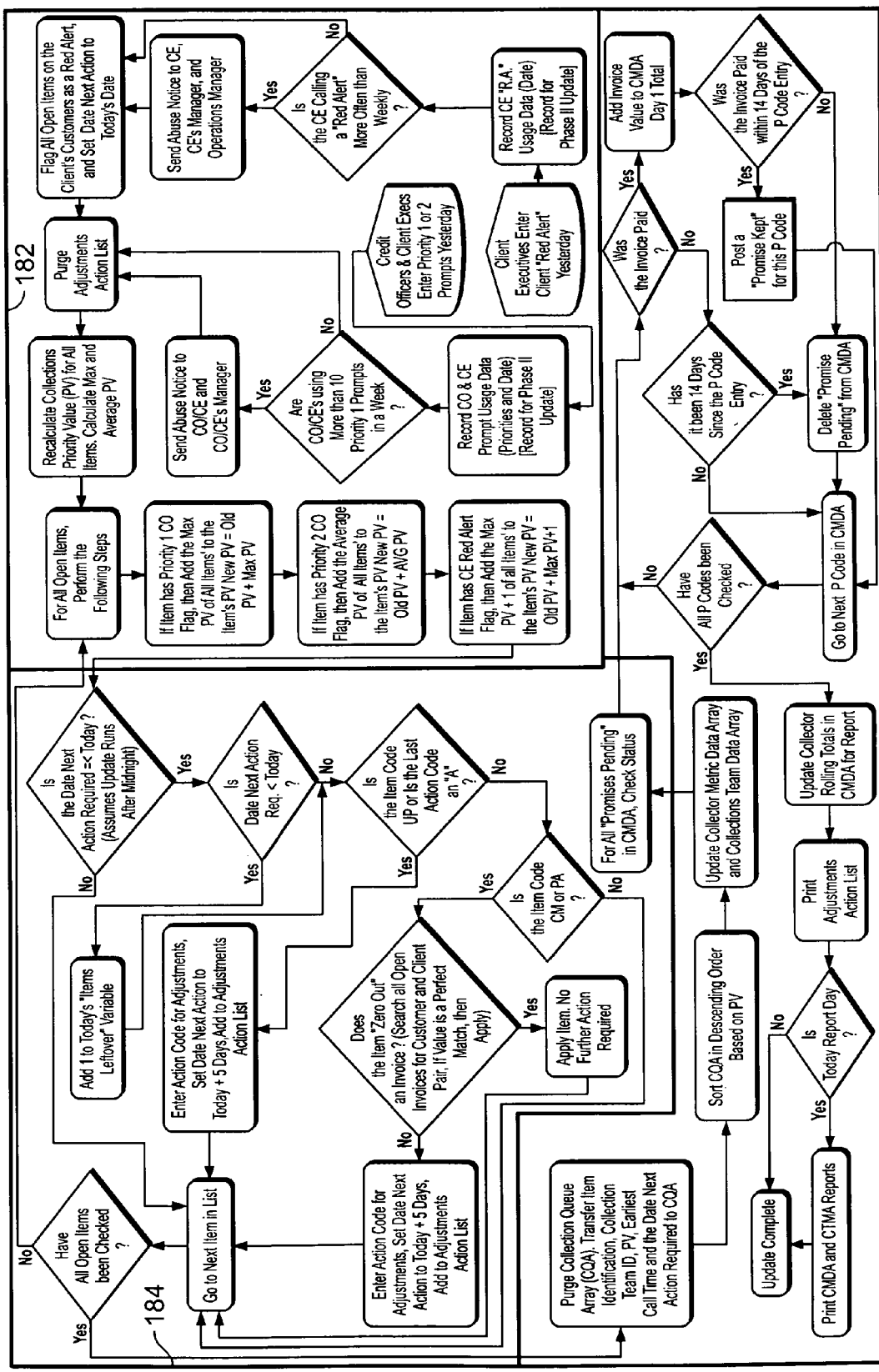
FIG. 7 is a flowchart showing the operation of the nightly update routine.

FIG. 7 is a flowchart 180 showing the operation of the nightly routine to update the open accounts database based upon the inputs from collectors from the previous day, payments received, and red flag inputs. Area 182 describes steps that system 10 takes to monitor abuses of red flags and priority 1 prompts by collectors, credit officers, and client executives. In particular, system 10 checks how frequently collectors use red alerts, and sends an abuse notice to a client executive, client executive's manager, and an operations manager if a collector uses red alerts more frequently than specified. In one embodiment, more than one red alert per week triggers system 10 to send an abuse notice. Similarly, system 10 monitors use of priority 1 prompts by credit officers and client executives, and if priority 1 prompts are used more frequently than a specified value, system 10 sends an abuse notice to the credit officer or client executive and to the credit officer's or client executive's manager.

Area 182 also calculates priority values for the next day's priority list. If an item has a priority 1 flag, system 10 in one embodiment adds the maximum priority value of all items to the priority value of the priority 1 item, thereby moving it to the top of the next day's collection list. If an item has a priority 2 flag, system 10 in one embodiment adds the average priority value of all items to the priority value of the priority 2 item, thereby moving it up in the next day's collection list.

Flowchart 180 includes area 184 that updates accounts based upon collector's inputs to generate a future collection priority list. If an item has been marked paid in full, system 10 removes it from the collection priority list. If not, area 184 specifies the date of next action and adds the item to collection priority list on the date of next action. In one embodiment, the date of next action is five days hence.

Area 186 of flowchart 180 deals with promises to pay to verify whether payment has been received, and if not, system 10 returns the item to the collection queue array (CQA) for collection.

Figure 8:
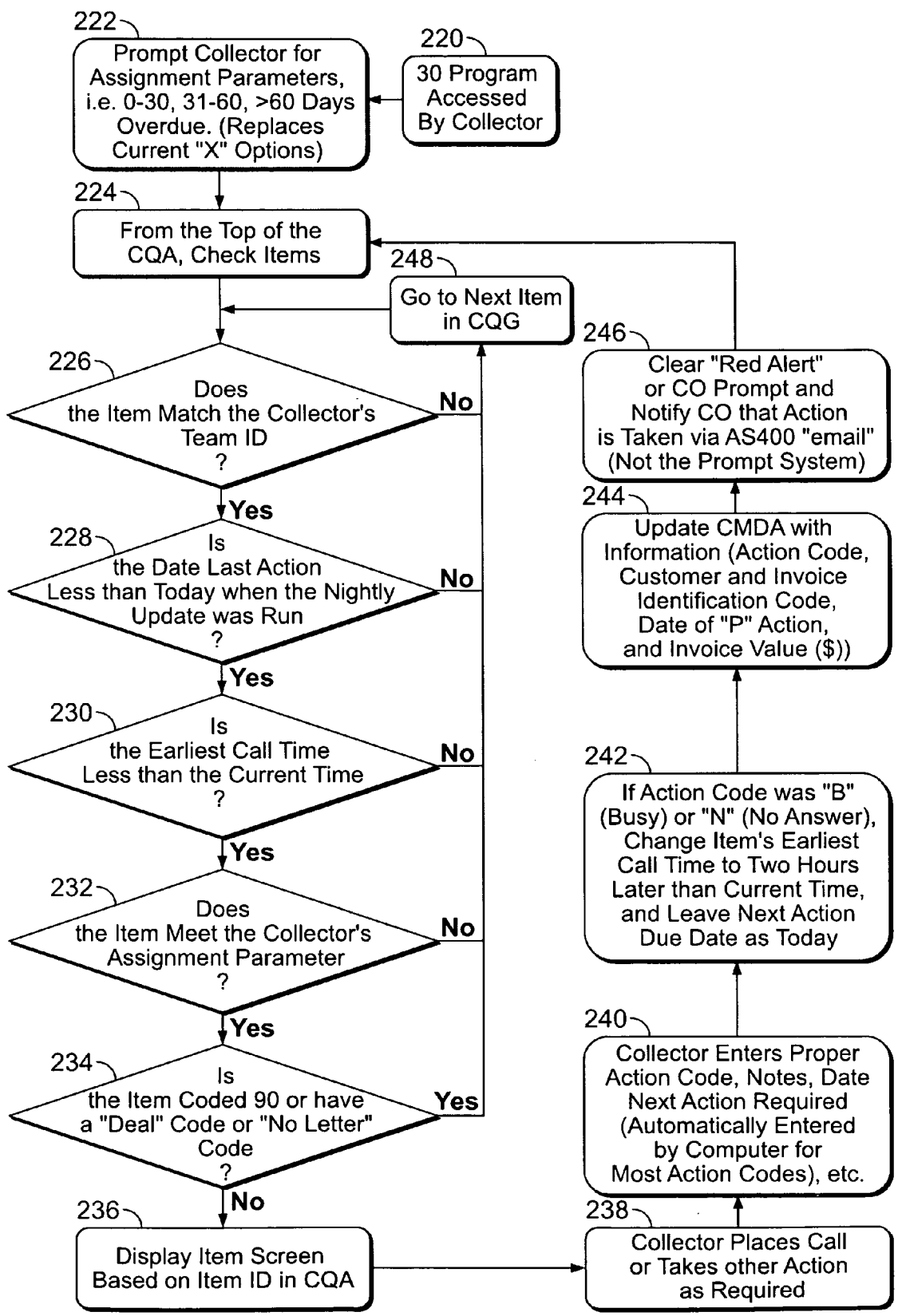
FIG. 8 is a flowchart showing how the system interacts with a collector.

FIG. 8 is a flowchart showing interaction of a collector with system 10. After system 10 is accessed 220 by a collector, system 10 prompts 222 the collector for assignment parameters, including in one embodiment a number of days overdue. System 10 then checks 224 items from the top of the collection queue array (CQA), and determines 226 whether the item matches the collector's team identification. If the answer to query 226 is affirmative, assistant and then determines 228 whether the date of the last action is less than the date when the nightly update was last run. If the answer to query 228 is affirmative, system 10 then determines 230 whether the earliest call time is less than the current time. If the answer to query 230 is affirmative, assistant and then inquires 232 whether the item meets the collector's assignment parameter. If the answer to query 232 is affirmative, system 10 then ascertains 234 whether the item is coded 90, has a "deal" code, or a "no letter" code.

If the answer to query 234 is negative, system 10 then displays 236 the item screen based on the item identification in the collection queue array. The collector then places 238 a call or takes other action as required, and then enters its 240 the proper action code, notes, and system 10 then enters the date the next action is required. If the action code was "B" (busy) for "N", system 10 changes 242 the items earlier call time to two hours later then current time, and leaves the next action due date as today. System 10 then updates 244 the collection metrics data array (CMDA) information including action code, customer could, invoice identification code, date of "P" action, and invoice value. System 10 then clears 246 a "Red Alert" or credit officer prompt, and notifies the credit officer of the action is taken via email had not the prompt system. System 10 then returns to the top of the collection queue array 224.

If the answer to any of queries 226, 228, 230, or 232 is negative, system 10 proceeds 248 to go to the next item in the collections queue grid (CQG).

FIG. 9 shows a table of action codes 250, explanations 252 used in system 10 (shown in FIG. 1), and automatic dates 254 when the next action is scheduled. Action codes in FIG. 9 include those for proof of delivery sent (D), invoice copy faxed (I), referred to legal collections (L), referred to adjustments (A), faxed statement to customer (S), left a message for customer to call back (M), spoke with the right person (R) but did not get a promise to pay, and they did not request any information (i.e. customer is researching, etc.), received a promise to pay (P), busy signal (B), no answer (N), applied payment (O) or credit memo (CM). Each of the above action codes is associated with a date when the next collection action is automatically scheduled by system 10.

FIG. 10 shows an exemplary embodiment of the collector report form generated by system 10 (shown in FIG. 1). The exemplary collector report form includes fields for item number, time started working on an item, time finished working on an item, time on item, and whether a call is to be made in connection with the item.

FIG. 11 is a continuation page from a collector report form generated by system 10 (shown in FIG. 1). FIG. 11 includes fields for invoices not called, their item number, time the collector started working on the item, time the collector finished working on the item, the total time spent on the item, and the action code assigned to the item.

FIG. 12 is a second continuation page of a collector report form generated by system 10 (shown in FIG. 1). FIG. 12 includes fields for item number, the time a call started, the time a call ended, the length of the call, the time completed action, and total time on the item.

FIG. 13 is a third continuation page of a collector report form generated by system 10 (shown in FIG. 1), and includes fields for calls made, and whether or no answer was received, the right person was contacted, a message was left, a promise to pay was received, or other outcome was achieved.

The collectors report described in FIGS. 10-13 is generated by system 10 to track individual collector performance and to give management personnel feedback on time spent on various portions of a collections operation in an effort to find ways to make the collections operation more efficient, and to find ways to help the collection employee improve their performance.

FIG. 14 shows a table of collector efficiency metrics tracked by system 10 (shown in FIG. 1). Metrics tracked as a measure of collector efficiency include average time to prepare an item, the minimum time to prepare an item, the maximum time to prepare an item, the average time for an item not called, the minimum time for an item not called, the maximum time for an item not called, the average time for an item called, the minimum time for an item called, the maximum time for an item called, the average length of a call, the minimum length of a call, the maximum length of a call, the number of letters sent to a lawyer for collection, the number of adjustments, the number of invoices faxed, the number of statements faxed, the number of calls not answered, the number of times the correct person was contacted, the number of messages left, the number of promises to pay received, the number of other actions taken, and the percentile each of the above quantities represents with respect to the other collectors. System 10 is configurable to run collector efficiency reports which incorporate the metrics described above at any one of a daily, weekly, monthly or quarterly cycle.

In use, system 10 provides an objectively based way of assigning debt collections priorities systematically and consistently across an organization, regardless of its size, and regardless of the experience of the collectors within the organization. An action code entered by a collector determines the status of an item on a future collection prioritization list generated by system 10 for the same or another collector. While the invention has been described in terms of various specific embodiments, those skilled in the art will recognize that the invention can be practiced with modification within the spirit and scope of the claims.

What is claimed is:

1. A system for prioritizing debt collections for a collector having customers with debt, the debt relating to an item acquired by a customer, said system comprising:
at least one computer;
a server configured to:
receive data from the at least one computer relating to items associated with debt collections;
generate a collection priority value for each item entered into said system, the collection priority value is based on a number of days past due for an item, a value of an item, a customer's total outstanding balance, a customer's credit score, a customer's internal payment history score, a number of days since action due date for an item, and a total number of open items for that customer, wherein the collection priority value is determined from the equation:

$$PV = a_1 x_1 + a_2 (\log(x_2))^{a_7} + a_3 \left[ \frac{x_2}{\left(\frac{x_3}{y}\right)} \right] + a_4 x_4 + a_5 x_5 + a_6 x_6$$

generate a collection prioritization for the items stored within said system based on the collection priority value assigned to each item;
generate reports of collection activity associated with the items; and
provide a queue of prioritized items to users to drive collection efforts; and
a network interconnecting said server to said computers, where:
$x_1$=Number of Days Past Due for Item,
$x_2$=Value of Item,
$x_3$=Customer's Total Outstanding Balance,
$x_4$=Customer's Credit Score,
$x_5$=Customer's Internal Payment History Score,
$x_6$=Number of Days Since Action Due Date for Item,
y=Total Number of Open Invoices for that Customer, and
$a_1$=Optimized Coefficient for $x_1$,
$a_2$=Optimized Coefficient for $x_2$,
$a_3$=Optimized Coefficient for $x_3$,
$a_4$=Optimized Coefficient for $x_4$,
$a_5$=Optimized Coefficient for $x_5$,
$a_6$=Optimized Coefficient for $x_6$, and
$a_7$=Optimized Coefficient for $\log(x_2)$.

2. A system according to claim 1 wherein said server is configured to generate an updated collection priority value from uploaded collection data.

3. A system according to claim 1 wherein said server is configured to determine a time for a next customer contact based on uploaded collection data.

4. A system according to claim 1 wherein said server is configured with data to preclude a number of items from collection efforts.

5. A system according to claim 1 wherein said server is configured to upload at least one action code for each item, the action code entered by a user.

6. A system according to claim 5 wherein said server is configured with action codes for at least one of a proof of delivery sent, an invoice copy faxed, referred to legal collections, referred to adjustments, faxed statement to customer, left a message for customer to call back, spoke with the right person but did not get a promise to pay, received a promise to pay, busy signal, no answer, applied payment and credit memo.

7. A system according to claim 1 wherein said server is configured to remove an item from said system when the item balance is zero.

8. A system according to claim 1 wherein the customer's internal payment history score is calculated from the equation $$x_5 = \text{Internal Payment History Score} = 2.5\left[\left(\frac{z_1 - x_1}{a}\right)\left(\frac{z_1}{b}\right) + \left(\frac{z_2}{c}\right)\right]$$

Where, $$z_1 = \left(\frac{D_1(T_1 + T_2 + T_3)}{9T_1} + \frac{D_2(T_1 + T_2 + T_3)}{9T_2} + \frac{D_3(T_1 + T_2 + T_3)}{9T_3}\right),$$

normalized average days late $$z_2 = \left(\frac{\left[D_3\log(T_3) - \frac{T_3}{T_2}D_2\log(T_2)\right] + \left(D_2\log(T_2) - \frac{T_2}{T_1}D_1\log(T_1)\right)}{2}\right),$$

days late trend and where
a=Worst case number of days beyond the customer's average number of days late,
b=Worst case average days late caused by cyclic markets,
c=Absolute value of the days late velocity from on period to another,
$T_1$=Current Period,
$T_2$=Previous Period,
$T_3$=Prior Period,
$D_1$=Current Period,
$D_2$=Previous Period, and
$D_3$=Prior Period.

9. A system according to claim 7 wherein a is about 10, b is about 180, and c is about 10.

10. A system according to claim 1 wherein said server is configured to upload a red alert regarding an item and further configured to send an abuse notice to a user if a red flag has been applied to an item previously within a predetermined period.

11. A system according to claim 1 wherein said server is configured to generate collector reports on a cycle of at least one of daily, weekly, monthly and quarterly.

12. A system according to claim 1 wherein said server is configured to prompt a collector action based upon at least one of customer balance, days since letter sent, and time since last customer contact.

13. A system according to claim 1 wherein $a_1$ is about 1.43, $a_2$ is about 37.37, $a_3$ is about 11.59, $a_4$ is about 1, $a_5$ is about 8.89, $a_6$ is about 2.6, and $a_7$ is about 0.95.

14. A system according to claim 1 wherein said server is further configured to generate a list of items ordered by collection priority value.

15. A system according to claim 1 wherein said network is at least one of the Internet, an intranet, a local area network (LAN), a wide area network (WAN), dial-in-connections, cable modems and special high-speed ISDN lines.

16. A system according to claim 1 wherein said server is further configured to show data relating to the efficiency of collection efforts by a collector.

17. A system according to claim 16 wherein said sewer is further configured to show data relating to at least one of number of matters referred to a lawyer for collection, number of adjustments, number of invoices faxed, number of statements faxed.

18. A system according to claim 16 wherein said server is further configured to show data relating to at least one of number of debtors who failed to answer, number of correct debtors contacted, number of messages left, and number of promises to pay received.

19. A system for prioritizing debt collections for a collector having customers with debt, the debt relating to an item acquired by a customer, said system comprising:
means for receiving data relating to items associated with debt collections;
means for producing a collection priority value for an item to be collected, the collection priority value is based on a number of days past due for an item, a value of an item, a customer's total outstanding balance, a customer's credit score, a customer's internal payment history's score, a number of days since action due date for an item, and a total number of open items for that customer, wherein the collectionpriority value is determined from the equation:

$$PV = a_1 x_1 + a_2 (\log(x_2))^{a_7} + a_3 \left[\frac{x_2}{\left(\frac{x_3}{y}\right)}\right] + a_4 x_4 + a_5 x_5 + a_6 x_6$$

means for producing a collection priority queue based upon the collection priority value assigned to each item, the collection priority queue used for conducting collection activities; and
means for producing a report regarding an outcome of collection activities;
where:
$x_1$=Number of Days Past Due for Item,
$x_2$=Value of Item,
$x_3$=Customer's Total Outstanding Balance,
$x_4$=Customer's Credit Scores,
$x_5$=Customer's Internal Payment History Score,
$x_6$=Number of Days Since Action Due Date for Item,
y=Total Number of Open Invoices for that Customer, and
$a_1$=Optimized Coefficient for $x_1$,
$a_2$=Optimized Coefficient for $x_2$,
$a_2$=Optimized Coefficient for $x_3$,
$a_4$=Optimized Coefficient for $x_4$,
$a_5$=Optimized Coefficient for $x_5$,
$a_6$=Optimized Coefficient for $x_6$, and
$a_7$=Optimized Coefficient for $\log(x_2)$.

20. A system according to claim 19 further comprising means for storing data which precludes a number of items from collection efforts.

21. A system according to claim 19 wherein the customer's internal payment history score is calculated from the equation $$x_5 = \text{Internal Payment History Score} = 2.5\left[\left(\frac{z_1 - x_1}{a}\right)\left(\frac{z_1}{b}\right) + \left(\frac{z_2}{c}\right)\right]$$

Where, $$z_1 = \left(\frac{D_1(T_1 + T_2 + T_3)}{9T_1} + \frac{D_2(T_1 + T_2 + T_3)}{9T_2} + \frac{D_3(T_1 + T_2 + T_3)}{9T_3}\right),$$

normalized average days late

-continued $$z_2 = \left(\frac{\left[D_3\log(T_3) - \frac{T_3}{T_2}D_2\log(T_2)\right] + \left[D_2\log(T_2) - \frac{T_2}{T_1}D_1\log(T_1)\right]}{2}\right),$$

days late trend and where
a=Worst case number of days beyond the customer's average number of days late,
b=Worst case average days late caused by cyclic markets,
c=Absolute value of the days late velocity from on period to another,
$T_1$=Current Period,
$T_2$=Previous Period,
$T_3$=Prior Period,
$D_1$=Current Period,
$D_2$=Previous Period, and
$D_3$=Prior Period.

22. A system according to claim 19 further comprising means for a user to upload at least one of action codes regarding an item and a red flag regarding an item, said system further comprising means to send an abuse notice to a user if a red flag has been applied to an item previously within a predetermined period.

23. A method for prioritizing debt collections for a collector having customers with debt, the debt relating to at least one item acquired by a customer, said method comprising the steps of:
uploading data to a computer relating to items associated with debt collections; and
calculating a collection priority value for each item uploaded, the collection priority value is based on a number of days past due for an item, a value of an item, a customer's total outstanding balance, a customer's credit score, a customer's internal payment history score, a number of days since action due date for an item, and a total number of open items for that customer, wherein the collection priority value is determined from the equation:

$$PV = a_1x_1 + a_2(\log(x_2))^{a_7} + a_3\left[\frac{x_2}{\left(\frac{x_3}{y}\right)}\right] + a_4x_4 + a_5x_5 + a_6x_6$$

generating a collection prioritization for the items uploaded based on the collection priority value calculated for each item;
providing a queue of prioritized items to collectors to drive collection efforts;
where:
$x_1$=Number of Days Past Due for Item,
$x_2$=Value of Item,
$x_3$=Customer's Total Outstanding Balance,
$x_4$=Customer's Credit Score,
$x_5$=Customer's Internal Payment History Score,
$x_6$=Number of Days Since Action Due Date for Item,
y=Total Number of Open Invoices for that Customer, and
$a_1$=Optimized Coefficient for $x_1$,
$a_2$=Optimized Coefficient for $x_1$,
$a_3$=Optimized Coefficient for $x_3$.
$a_4$=Optimized Coefficient for $x_4$.
$a_5$=Optimized Coefficient for $x_5$,
$a_6$=Optimized Coefficient for $x_6$, and
$a_7$=Optimized Coefficient for $\log(x_2)$.

24. A method according to claim 23 further comprising the step of determining a time for a next customer contact based on uploaded collection data.

25. A method according to claim 23 further comprising the step of marking an item with at least one action code regarding the item.

26. A method according to claim 25 further comprising the step of precluding a number of items from collection efforts, based on an action code.

27. A method according to claim 25 wherein said step of marking an item with at least one action code further comprises the step of marking an item as at least one of proof of delivery sent, an invoice copy faxed, referred to legal collections, referred to adjustments, faxed statement to customer, left a message for customer to call back, spoke with the right person but did not get a promise to pay, received a promise to pay, busy signal, no answer, applied payment and credit memo.

28. A method according to claim 23 further comprising the step of removing an item from the computer when a customer's total outstanding balance is zero.

29. A method according to claim 23 further comprising the step of generating a collections report based upon the uploaded data.

30. A method according to claim 23 further comprising the step of prompting an action based upon at least one of customer balance, days since letter sent and time since last customer contact.

31. A method according to claim 23 wherein said step of calculating a collection priority value further comprises the step of calculating a collection priority value based on the customer's internal payment history score wherein the customer's internal payment history score is calculated from the equation $$x_5 = \text{Internal Payment History Score} = 2.5\left[\left(\frac{z_1-x_1}{a}\right)\left(\frac{z_1}{b}\right) + \left(\frac{z_2}{c}\right)\right]$$

Where, $$z_1 = \left(\frac{D_1(T_1+T_2+T_3)}{9T_1} + \frac{D_2(T_1+T_2+T_3)}{9T_2} + \frac{D_3(T_1+T_2+T_3)}{9T_3}\right),$$

normalized average days late $$z_2 = \left(\frac{\left[D_3\log(T_3) - \frac{T_3}{T_2}D_2\log(T_2)\right] + \left[D_2\log(T_2) - \frac{T_2}{T_1}D_1\log(T_1)\right]}{2}\right),$$

days late trend and where
a=Worst case number of days beyond the customer's average number of days late,
b=Worst case average days late caused by cyclic markets,
c=Absolute value of the days late velocity from on period to another,
$T_1$=Current Period,
$T_2$=Previous Period,
$T_3$=Prior Period,
$D_1$=Current Period,
$D_2$=Previous Period, and
$D_3$=Prior Period.

32. A method according to claim 31 further comprising the step of assigning a at about 10, b at about 180, and c at about 10.

33. A method according to claim 23 further comprising the step of generating a list of items ordered by collection priority value.

34. A method according to claim 23 further comprising the step of determining an efficiency of collection efforts.

35. A method according to claim 23, further comprising the step of setting $a_1$ at about 1.43, $a_2$ at about 37.37, $a_3$ at about 11.59, $a_4$ at about 1, $a_5$ at about 8.89, $a_6$ at about 2.69, and $a_7$ at about 0.95.

36. A method according to claim 23 further comprising the step of generating a list of debtors rank-ordered by collection priority value.

37. A method according to claim 23 further comprising the step of generating data relating to the efficiency of collection efforts by a collector.

38. A method according to claim 37 wherein the step of generating data relating to the efficiency of collection efforts by a collector further comprises the step of showing data relating to at least one of time spent preparing an item for collection, calling regarding an item, and time spent on a call.

39. A method according to claim 37 wherein the step of generating data relating to the efficiency of collection efforts by a collector further comprises the step of generating data relating to at least one of number of matters referred to a lawyer for collection, number of adjustments, number of invoices faxed, and number of statements faxed.

40. A method according to claim 37 wherein the step of generating data relating to the efficiency of collection efforts by a collector further comprises the step of showing data relating to at least one of number of debtors who failed to answer, number of correct debtors contacted, number of messages left, and number of promises to pay received.

41. A computer program embodied on a computer-readable medium for prioritizing debt collections for a collector having customers with debt, the debt relating to an item acquired by a customer, said program comprising at least one code segment that:

records data relating to items associated with debt collections;

generates a collection priority value for each item recorded, the collection priority value is based on a number of days past due for an item, a value of an item, a customer's total outstanding balance, a customer's credit score, a customer's internal payment history score, a number of days since action due date for an item, and a total number of open items for that customer, wherein the collection priority value is determined from the equation:

$$PV = a_1 x_1 + a_2 (\log(x_2))^{a_7} + a_3 \left[ \frac{x_2}{\left( \frac{x_3}{y} \right)} \right] + a_4 x_4 + a_5 x_5 + a_6 x_6$$

assigns a collection priority value to each item; and
provides a queue of prioritized items to collectors to drive collection efforts based on the collection priority value assigned to each of the items
where:
$x_1$=Number of Days Past Due for Item,
$x_2$=Value of Item,
$x_3$=Customer's Total Outstanding Balance,
$x_4$=Customer's Credit Score,
$x_5$=Customer's Internal Payment History Score,
$x_6$=Number of Days Since Action Due Date for Item,
y=Total Number of Open Invoices for that Customer, and
$a_1$=Optimized Coefficient for $x_1$,
$a_2$=Optimized Coefficient for $x_2$,
$a_3$=Optimized Coefficient for $x_3$,
$a_4$=Optimized Coefficient for $x_4$,
$a_5$=Optimized Coefficient for $x_5$,
$a_6$=Optimized Coefficient for $x_6$, and
$a_7$=Optimized Coefficient for $\log(x_2)$.

42. A system for prioritizing debt collections for a collector having customers with debt, the debt relating to an item acquired by a customer, said system comprising:

at least one computer;
a server configured to:
receive data from the at least one computer relating to items associated with debt collections;
generate a collection priority value for each item entered into said system, the collection priority value is based on a number of days past due for an item, a value of an item, a customer's total outstanding balance, a customer's credit score, a customer's internal payment history score, a number of days since action due date for an item, and a total number of open items for that customer, wherein the customer's internal payment history score is calculated from the equation:

$$x_5 = \text{internal Payment History Score} = 2.5\left[\left(\frac{z_1 - x_1}{a}\right)\left(\frac{z_1}{b}\right) + \left(\frac{z_2}{c}\right)\right]$$

Where, $$z_1 = \left(\frac{D_1(T_1 + T_2 + T_3)}{9T_1} + \frac{D_2(T_1 + T_2 + T_3)}{9T_2} + \frac{D_3(T_1 + T_2 + T_3)}{9T_3}\right),$$

normalized average days late $$z_2 = \left(\frac{\left[D_3 \log(T_3) - \frac{T_3}{T_2} D_2 \log(T_2)\right] + \left[D_2 \log(T_2) - \frac{T_2}{T_1} D_1 \log(T_1)\right]}{2}\right),$$

days late trend generate a collection prioritization for the items stored within said system based on the collection priority value assigned to each item;
generate reports of collection activity associated with the items; and
provide a queue of prioritized items to users to drive collection efforts; and
a network interconnecting said server to said computers,
where:
a=Worst case number of days beyond the customer's average number of days late,
b=Worst case average days late caused by cyclic markets,
c=Absolute value of the days late velocity from on period to another,
$T_1$=Current Period,
$T_2$=Previous Period,
$T_3$=Prior Period,
$D_1$=Current Period,
$D_2$=Previous Period, and
$D_3$=Prior Period.

* * * * *